(12) United States Patent
Jha et al.

(10) Patent No.: US 10,221,971 B2
(45) Date of Patent: Mar. 5, 2019

(54) FLEXIBLE PIPE BODY AND METHOD OF MANUFACTURE

(71) Applicant: GE OIL & GAS UK LIMITED, Bristol (GB)

(72) Inventors: Vineet Kumar Jha, Newcastle upon Tyne (GB); Neville Dodds, Newcastle upon Tyne (GB); James Robert Latto, Newcastle upon Tyne (GB)

(73) Assignee: GE OIL & GAS UK LIMITED, Nailsea Bristol (GB)

( * ) Notice: Subject to any disclaimer, the term of this patent is extended or adjusted under 35 U.S.C. 154(b) by 0 days.

(21) Appl. No.: 14/783,964

(22) PCT Filed: Feb. 21, 2014

(86) PCT No.: PCT/GB2014/050514
§ 371 (c)(1),
(2) Date: Oct. 12, 2015

(87) PCT Pub. No.: WO2014/167279
PCT Pub. Date: Oct. 16, 2014

(65) Prior Publication Data
US 2016/0047499 A1 Feb. 18, 2016

(30) Foreign Application Priority Data

Apr. 12, 2013 (GB) .................................. 1306667.5

(51) Int. Cl.
*F16L 11/12* (2006.01)
*B29C 53/58* (2006.01)
(Continued)

(52) U.S. Cl.
CPC .............. *F16L 11/12* (2013.01); *B29C 35/02* (2013.01); *B29C 53/582* (2013.01); *B29C 65/72* (2013.01);
(Continued)

(58) Field of Classification Search
None
See application file for complete search history.

(56) References Cited

U.S. PATENT DOCUMENTS 3,378,426 A 4/1968 Medney
5,343,895 A 9/1994 King et al.
(Continued)

FOREIGN PATENT DOCUMENTS

CN 101334122 A 12/2008
FR 2 709 529 A1 3/1995
(Continued)

OTHER PUBLICATIONS

International Search Report and Written Opinion for corresponding PCT/GB2014/050514, dated May 2, 2014.
(Continued)

*Primary Examiner* — Craig Schneider
*Assistant Examiner* — David Deal
(74) *Attorney, Agent, or Firm* — Reza Mollaaghababa; Thomas J. Engellenner; Pepper Hamilton LLP

(57) ABSTRACT

A flexible pipe body and method of producing a flexible pipe body are disclosed. The method includes providing one or more composite filament (302) as a filament bundle (310); applying a braid element (304) around the filament bundle as a braided bundle (310); helically wrapping the braided bundle (310) around a flexible pipe layer (502); and then curing (510) the one or more composite filament (302).

17 Claims, 5 Drawing Sheets

(51) Int. Cl.
| | |
|---|---|
| *F16L 11/08* | (2006.01) |
| *B32B 27/12* | (2006.01) |
| *B32B 1/08* | (2006.01) |
| *B29C 35/02* | (2006.01) |
| *B29C 65/72* | (2006.01) |
| *B29C 65/78* | (2006.01) |
| *B29C 65/00* | (2006.01) |
| *F16L 1/14* | (2006.01) |
| *F16L 11/02* | (2006.01) |
| *F16L 11/10* | (2006.01) |
| *F16L 57/02* | (2006.01) |
| *B29C 70/86* | (2006.01) |
| *B29L 23/00* | (2006.01) |
| *B29K 63/00* | (2006.01) |
| *B29K 105/08* | (2006.01) |
| *B29K 307/04* | (2006.01) |
| *B29K 105/10* | (2006.01) |

(52) U.S. Cl.
CPC .......... *B29C 65/7858* (2013.01); *B29C 66/69* (2013.01); *B29C 70/86* (2013.01); *B32B 1/08* (2013.01); *B32B 27/12* (2013.01); *F16L 1/14* (2013.01); *F16L 11/02* (2013.01); *F16L 11/083* (2013.01); *F16L 11/10* (2013.01); *F16L 57/02* (2013.01); *B29K 2063/00* (2013.01); *B29K 2105/0872* (2013.01); *B29K 2105/0881* (2013.01); *B29K 2105/10* (2013.01); *B29K 2307/04* (2013.01); *B29L 2023/005* (2013.01); *B29L 2023/22* (2013.01); *B32B 2260/023* (2013.01); *B32B 2260/046* (2013.01); *B32B 2262/0223* (2013.01); *B32B 2262/0253* (2013.01); *B32B 2262/0261* (2013.01); *B32B 2262/0276* (2013.01); *B32B 2262/101* (2013.01); *B32B 2262/103* (2013.01); *B32B 2262/106* (2013.01); *B32B 2307/54* (2013.01); *B32B 2307/554* (2013.01); *B32B 2307/584* (2013.01); *B32B 2307/714* (2013.01); *B32B 2597/00* (2013.01)

(56) References Cited

U.S. PATENT DOCUMENTS

| | | | |
|---|---|---|---|
| 5,744,206 A | 4/1998 | Russek et al. | |
| 5,771,673 A * | 6/1998 | Lorch | A01K 91/00 57/232 |
| 6,165,586 A | 12/2000 | Nouveau et al. | |
| 6,390,141 B1 * | 5/2002 | Fisher | F16L 11/081 138/125 |
| 6,491,779 B1 * | 12/2002 | Bryant | F16L 11/081 156/169 |
| 6,620,471 B1 | 9/2003 | Do | |
| 6,620,475 B1 * | 9/2003 | Reynolds, Jr. | B29C 53/8016 138/125 |
| 7,114,751 B2 * | 10/2006 | Reynolds, Jr. | B29C 33/505 138/97 |
| 7,264,021 B1 * | 9/2007 | Daikai | B29C 57/04 138/123 |
| 2005/0054248 A1 | 3/2005 | Philp et al. | |
| 2009/0205733 A1 * | 8/2009 | Stringfellow | F16L 55/1652 138/104 |

FOREIGN PATENT DOCUMENTS

| | | |
|---|---|---|
| GB | 1273454 | 5/1972 |
| GB | 1398 229 A | 6/1975 |
| JP | S488867 B1 | 3/1973 |
| WO | 99/49259 A1 | 9/1999 |
| WO | 200133129 A1 | 5/2001 |
| WO | 2012131315 A1 | 10/2012 |

OTHER PUBLICATIONS

Chinese Office Action from corresponding Chinese Patent Application 201480021059.7, dated Nov. 1, 2016; 21 Pages.
Search Report issued in connection with corresponding GB Application No. GB1306667.5 dated Sep. 30, 2013.
Intention to Grant issued in connection with corresponding EP Application No. 14706682.3 dated Mar. 13, 2018.
Search & Examination Report dated Oct. 15, 2018 for corresponding Malaysian Patent Application No. PI 2015002517, 3 pages.

* cited by examiner

FLEXIBLE PIPE BODY AND METHOD OF MANUFACTURE

The present invention relates to a flexible pipe body and a method of manufacture of a flexible pipe body. In particular, but not exclusively, the present invention relates to the use of composite materials in an armour layer of a flexible pipe body, and a method of arranging and curing filaments of composite material to form the armour layer.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wired forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the pressure armour and tensile armour layers of the flexible pipe body is increased.

Flexible pipe may also be used for shallow water applications (for example less than around 500 meters depth) or even for shore (overland) applications.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

Metallic armour wires may add considerable weight to the flexible pipe body across the length of the pipe. Composite material may be used as an alternative to metal to provide sufficient strength to a pipe body without significantly increasing the weight.

One technique which has been used in the past to in some way alleviate the above-mentioned problem is the use of fibre-reinforced polymeric material (or composites) as structural elements in flexible pipes. Composites provide a high specific strength and stiffness and can enable reduced pipe weight (reducing top tension), and increase chemical resistance of the pipe compared to known metallic materials. The composite may be initially provided as a "pre-preg", i.e. pre-impregnated with fibres.

Thermoset composites employing high-strength, high-stiffness fibres are not ductile and cannot be plastically deformed like metals and have a limited ultimate strain in the order of 2% or less. Composite materials for making sections with reasonable dimensions therefore pose difficulties in the manufacturing process. A thermosetting material is defined as a material that cannot be re-melted after curing. A thermosetting material is the material in its uncured or partially cured state. A thermosetting composite that has been cured is herein defined as thermoset. A thermosetting composite may be formed into a tape and heated to cure the material. However, when the formed tape is wound to create a layer of a tubular pipe body, strain is introduced into the material, which affects performance. During winding onto a cylindrical base, a tape is bent in two planes, which can cause warping.

WO2012/131315 discloses a method of producing a flexible pipe body where a pre-preg composite material is fed under constant tension and wound helically over a fluid-retaining layer. Then the wound layer enters an oven where the pre-preg is cured.

U.S. Pat. No. 6,165,586 discloses a flat strip for reinforcing ducts including a layer of filamentary rovings. WO99/49259 discloses a composite carbon fibre armour for flexible pipe including carbon filament slivers.

It would be useful to provide an improvement or alternative method of forming a flexible pipe body.

According to a first aspect of the present invention there is provided a method of manufacturing a flexible pipe body comprising:

providing one or more composite filament as a filament bundle;

applying a braid element around the filament bundle as a braided bundle;

helically wrapping the braided bundle around a flexible pipe layer;

and then curing the one or more composite filament.

According to a second aspect of the present invention there is provided a flexible pipe body for transporting fluids from a sub-sea location, comprising:

an inner layer; and an armour layer provided over the inner layer, wherein said armour layer is obtainable by the process of:

providing one or more composite filament as a filament bundle;

applying a braid element around the filament bundle as a braided bundle;

helically wrapping the braided bundle around the inner layer;

and then curing the one or more composite filament.

Certain embodiments of the invention provide the advantage that a braided bundle is more flexible compared to a solid pultruded section, allowing wrapping of the filaments substantially without tension and also enabling the filaments to find their natural or preferred position with respect to each other and the object that they overlie.

Certain embodiments of the invention provide the advantage that the armour layer is formed substantially or completely free of residual strain, because the length of material is cured 'in situ', i.e. not formed into a new position after the curing stage. Certain embodiments of the invention provide a flexible pipe formed with reduced weight and improved performance compared to pipes with standard armour layers. The composite material provides high strength at a controlled weight. Specific materials can be chosen for the required application. It will be appreciated however that the present invention will be particularly suitable for deep and ultra-deep water operation, where pressure on a pipe is higher due to the weight of the long pipe length, as well as the surrounding water itself, and a high strength per unit weight material is paramount.

Embodiments of the invention are further described hereinafter with reference to the accompanying drawings, in which.

In the drawings like reference numerals refer to like parts.

Figure 1:
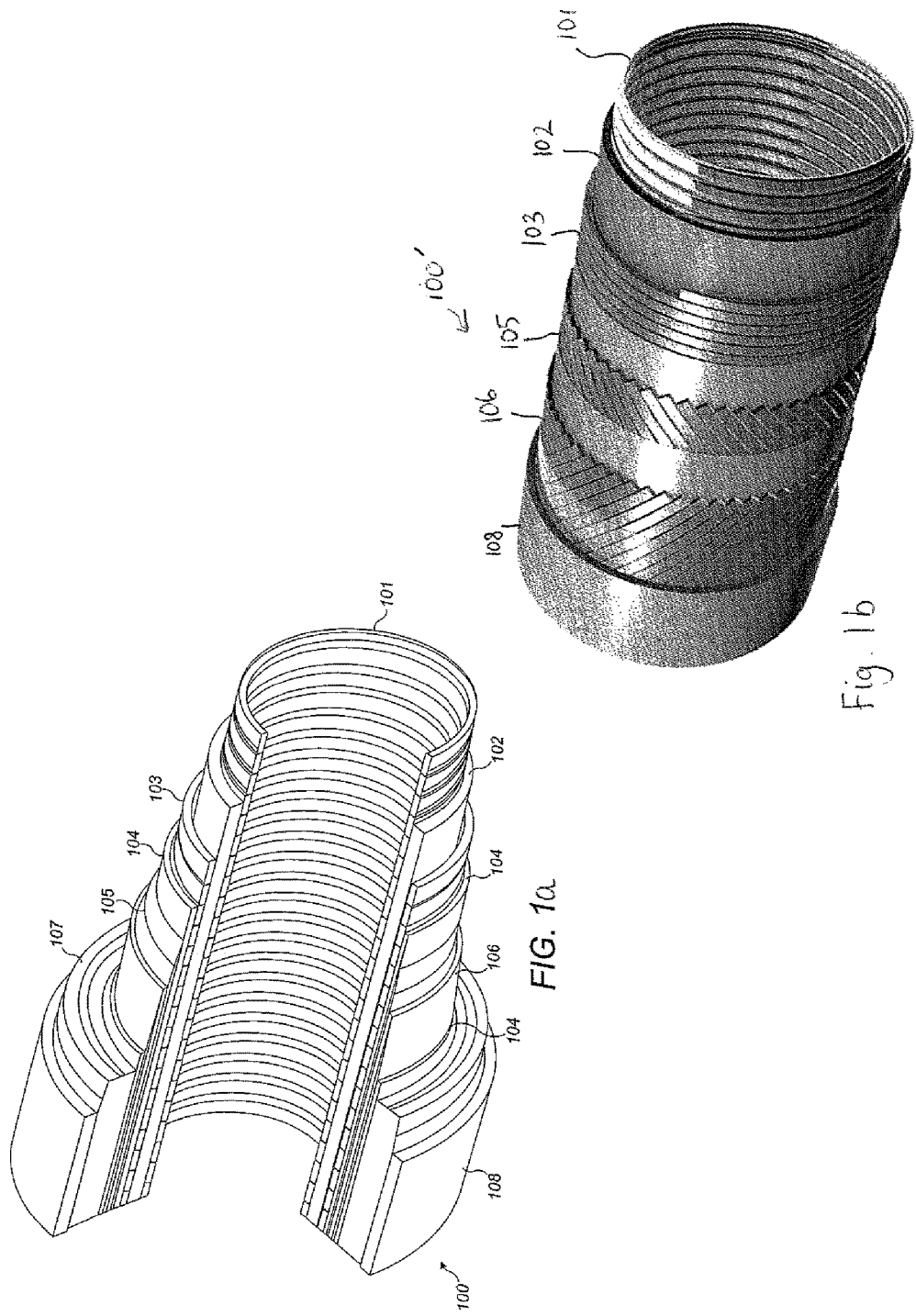
FIGS. 1a and 1b illustrate a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1a illustrates how pipe body 100 is formed in accordance with an embodiment of the present invention from a combination of layered materials that form a pressure-containing conduit. Although a number of particular layers are illustrated in FIG. 1a, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1a, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically consists of an interlocked construction of wires with a lay angle close to 90°.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

FIG. 1b shows another pipe body 100' illustrating a possible lay angle of the tensile armour wires 105, 106.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1a or 1b are terminated in the end fitting in such a way as to transfer the load between the flexible pipe and the connector.

Figure 2:
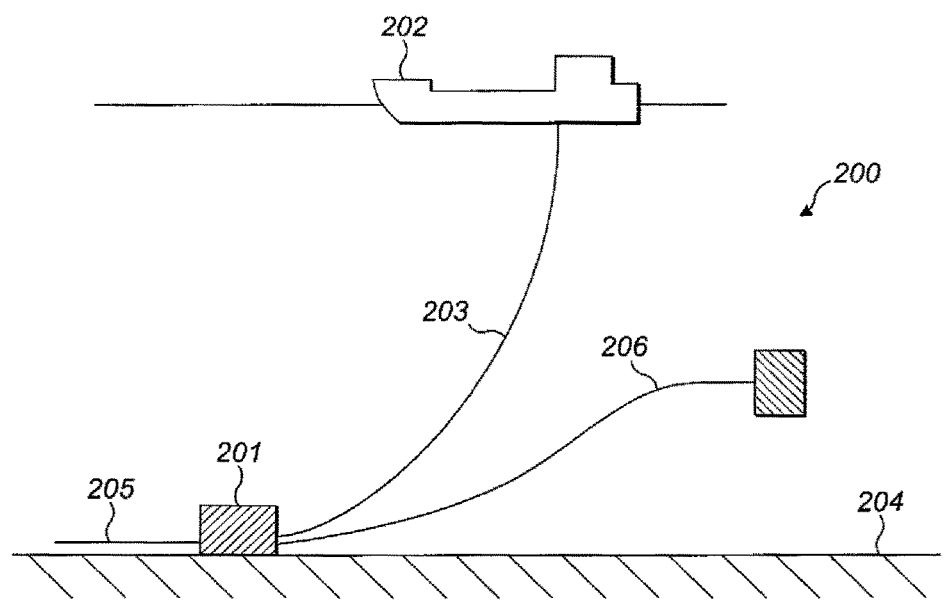
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
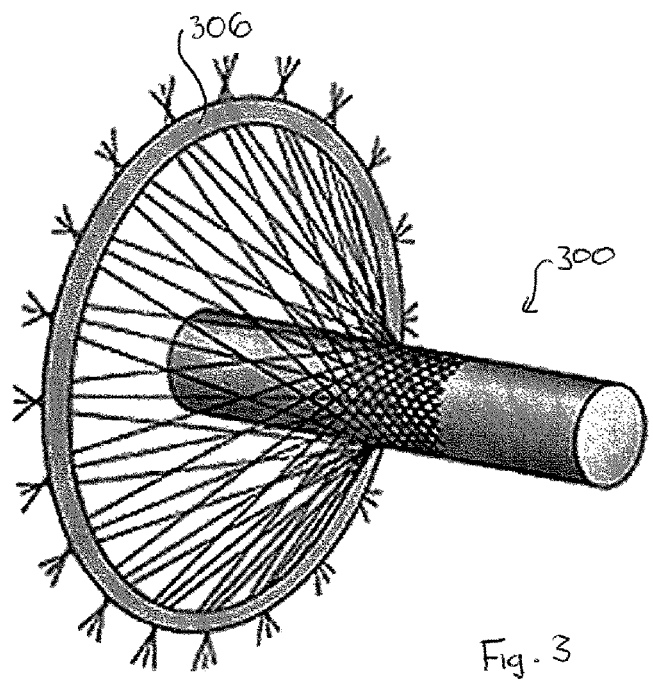
FIG. 3 illustrates a braiding machine.
Figure 4:
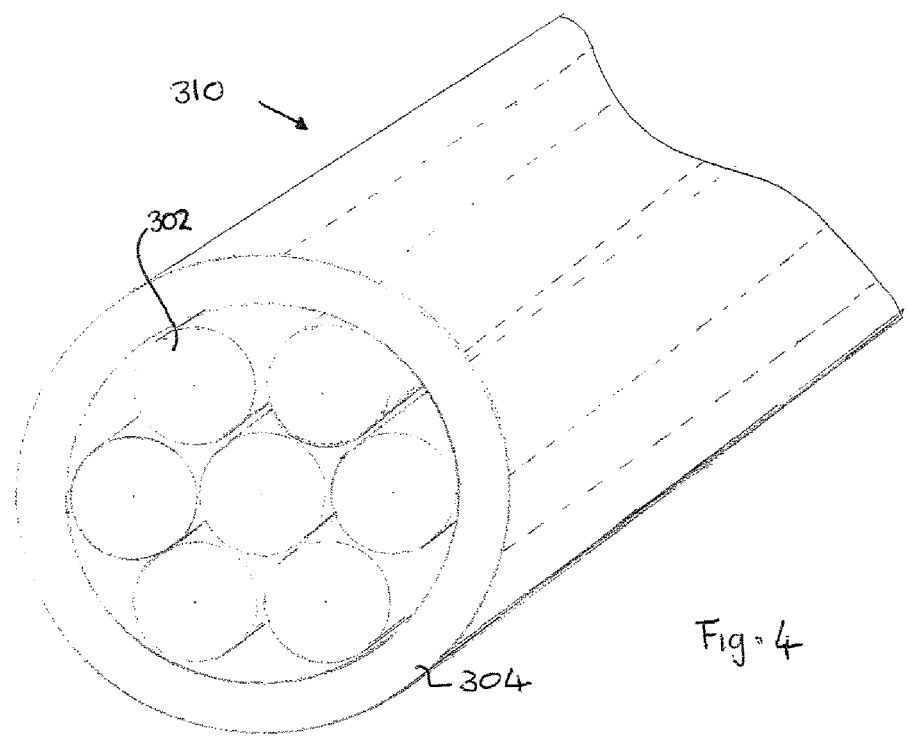
FIG. 4 illustrates a braided bundle for forming an armour layer according to the present invention.

FIGS. 3 and 4 illustrate a tensile armour wire 300 formed by a method of the present invention. The armour wire 300 includes one or more composite filament 302. Here there are a plurality of filaments 302, though for the purposes of the description here, a single composite filament may be termed a filament bundle.

More specifically, a composite filament may be a length (fibre, rod, bar, prism, for example) of composite material and may include a unidirectional composite fibre (e.g. a composite matrix material plus reinforcing fibres). In this example the composite filament is an epoxy resin with unidirectional carbon fibres as reinforcing elements. The composite of matrix material and fibres can be obtained in pre-preg form from Zoltek Companies, Inc. This pre-preg is available in a partially cured state, with curing having been chemically retarded to enable easy handling, a continuous pre-preg material with even, minimal stress distribution over the material. The ratio of matrix to fibre (volume fraction of fibres) is around 50%. However, many thermosetting pre-preg materials may be suitable such as thermosetting, polyimides, bismaleimides, phenolics and modified epoxies. The reinforcing fibres could be any suitable fibre such as glass, ceramic, metal, polymeric fibres such as aramid, or mixtures thereof. The volume fraction of fibres could be any amount from around 40% to around 75%, aptly around 40% to 65%. The composite may further include other modifiers such as pigments or plasticizers. Aptly, most of the reinforcing fibres are orientated lengthways along the longitudinal axis of the tensile armour element. Some transverse or angled fibres may be included to help stabilize the structure. For example, more than 50%, or 60%, or 70%, or 80% or 90%, of the fibres can be aligned in a direction substantially axially with the length of material. Such orientation can help to stabilize the armour element during use.

The plurality of filaments 302 are bundled together lengthways as the filament bundle.

A braid element 304 is applied around the filament bundle to form a braided bundle 310, as shown in FIG. 3. The braiding machine 306 is used to apply a braid of strands over the filament bundle. The braiding machine is known per se in the art and will not be described further for brevity. However, the specific weave or density of the braiding may be predetermined to suit the type and amount of filaments that are to be bundled.

The braiding acts to hold the composite filaments 302 in place as a bundle 310. The braid element may also protect and/or strengthen the composite filaments in certain embodiments. In this example the braiding element (fibres) 304 are a polypropylene tape, though the braid element may be or include a polymer tape, polymer fibres, a polyethylene, a PVDF, a Dyneema®, a reinforced polymer tape, a fibre yarn, thermoplastic material, thermoset material, glass fibre composite tape, aramid fibre yarn, tapes or fibres with thermoplastic encapsulation, tapes or fibres with partial thermoset matrix impregnation, or a combination thereof.

Next, the braided bundle 310 is helically wrapped around a radially inner flexible pipe layer to form an armour layer. In typical use the armour elements are wound at a lay angle of around 20 to 88 degrees to the axis of the pipe. It will be appreciated that a single braided bundle may be helically wrapped to form a layer, or a number of braided bundles may be provided and applied as adjacent windings to form a layer.

Figure 5:
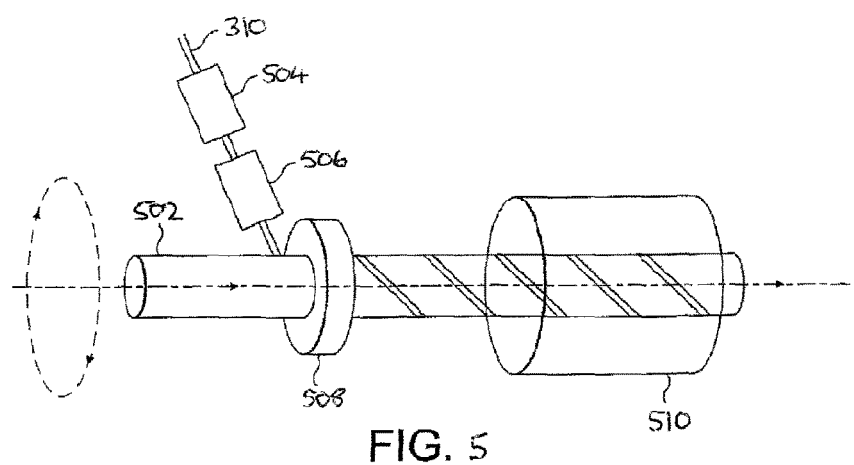
FIG. 5 illustrates apparatus for producing a flexible pipe.

FIG. 5 shows an apparatus for wrapping a braided bundle 310 over a radially inner layer 502 of flexible pipe body. The inner layer 502 is positioned using a guide 508 and moved laterally at a predetermined speed while the braided bundle is rotated around the flexible pipe body inner layer in order to helically wrap the bundle around the inner layer. The bundle 310 is fed towards the inner layer 502 at a predetermined angle and speed so as to be wrapped around the inner layer. Guiding elements 504, 506, 508 help to position the braided bundle more precisely in an accurate helical winding formation and may be aptly used to pre-form the braided bundle into a helical curve and direct the bundle shape prior to the wrapping onto the inner layer. That is, the bundle 310 is applied to the layer 502, being wrapped around the layer 502 by virtue of the rotation of the equipment including the guides 504, 506 and 508 and the bundle feed 310, and the linear translation of the layer 502.

Of course alternatively the inner layer 502 could be rotated while the bundle feed 310 and the guides 504, 506 and 508, remain in a fixed position. The wound braided bundle forms the shape of tensile armour layer.

Although only one feed 310 is shown, further feeds can be used so as to allow further armour wires to be wound onto the pipe body. Further armour wires will increase the number (and relative density) of armour wires in the layer. A suitable number of elements (braided bundles) can be chosen such that the elements are configured so as to be able to move relative to one another but still to provide sufficient support to the inner layers of the pipe and to the flexible pipe as a whole.

It will be appreciated that a further layer of armour elements could be provided over the first layer of armour elements by either counter-winding elements in the opposite direction to the first layer, or winding in the same helical direction. For example, in order to balance torque induced when the pipe is pressurised or put under tensile load it may be desirable to wind the further layer in the opposite helical direction to the first layer. If however the further layer is configured to continuously interact and interlock with the first layer it is desirable to wind the further layer in the same orientation as the first layer.

It will also be appreciated that the further layer of armour elements could be provided over the first layer of armour elements in series with the first layer, in one continuous process, thereby making the manufacturing process more efficient for providing multiple layers on a flexible pipe.

Following helical wrapping of the braided bundle, the composite filaments 302 are then cured by heating the pipe body in an oven 510 to thereby change one or more physical and/or mechanical property of the composite filaments 302.

Because of the lateral movement of the pipe body the pipe body is fed through the oven 510 and receives heat for a predetermined time.

In the current embodiment the oven 510 is set to 220° C. to initiate curing of epoxy resin of the armour element 310, though it will be clear that other temperatures could be chosen, which will affect the curing time of the epoxy, and thus the speed at which the pipe body should travel through the oven.

In this embodiment epoxy resin is cured in the heating region by the oven. It will be apparent that the material could alternatively be cured in other ways, such as by application of other forms of radiation, or chemically cured. Curing may include treating the composite filaments 302 with heat or chemicals or a combination of both to change at least one physical and/or mechanical property, for example, the strength or Young's modulus. It will be appreciated that the braiding structure may also be subject to such heat and/or chemicals and consequently may also be cured.

The armour layer 300 as described above may be used as part of a flexible pipe body, in combination with one or more other layers such as those described above with reference to FIG. 1. For example, a flexible pipe body may include an inner layer, for example a fluid retaining layer (liner), and an armour layer, for example a tensile armour layer, the tensile armour layer provided over the inner layer. Any armour layer may be formed by the method described above.

Various modifications to the detailed designs as described above are possible. For example, although an armour layer has been described above, the same techniques may be applied to form any other strength layer of a flexible pipe body.

Although the method described above describes wrapping a braided bundle over a radially inner layer of pipe body, the braided bundle may alternatively be wrapped over a mandrel, which can subsequently be removed.

Although the entire pipe layer above was heated so as to cure the filaments, alternatively a selective curing or selective heat source may be used so as to cure only the filaments (and not affect the other elements such as the braiding or other pipe layers. An example of an alternative heating means is the use of induction heating.

Figure 6:
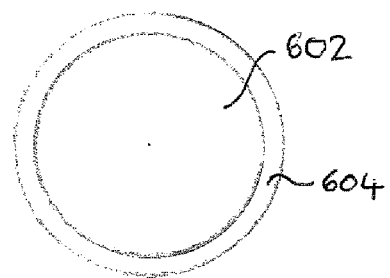
FIG. 6 illustrates a further braided bundle of the present invention.
Figure 7:
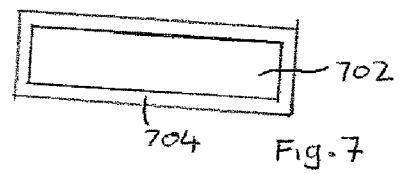
FIG. 7 illustrates a yet further braided bundle of the present invention.

Although a plurality of filaments have been described above to form the filament bundle the bundle may consist of a single filament 602, 702, as shown in FIG. 6 or 7. The filament may be subject to braiding to form an outer braid 604, 704. The filament may have any cross section, for example round or rectangular as shown.

Although the plurality of filaments described above is all of one type, a combination of types of material may be combined to provide the braided bundle with a specific set of properties. One embodiment of this is to include one or more metallic wires or strands in the bundle as a stiffening element which could act as a support for the other filaments and the braid prior to consolidation and curing, could encourage retention of at least a degree of any pre-forming offered by guides 504, 506, and 508, and could act as heating elements within the structure when using induction for heat curing the braided bundle. Such a metallic wire would only provide limited strength and support in the flexible pipe body once the filaments are cured.

In addition to the steps described, a lubricant or uncured resin may optionally be applied to the filament bundle prior to applying the braid element.

The material of the braiding itself may be adapted to provide wear resistance or low coefficient of friction between bundles and between layers in the flexible pipe. Such a material may be selected from coated yarns or fibres of from materials of inherently low frictional properties. The type of weave and combinations of fibres woven together in combination may also be selected to provide the desired shape and performance from the outer braid.

The outer braid may also be of materials selected so that any pre-form shape imparted by the guides 504, 506 and 508 is maintained until such time as curing of the resin in the braided bundle is complete. Such pre-formed shapes may include rectangular, round, S or Z shape, T shape, C shape or X shape bundles. Combinations of such shapes may be used together in the same layer of the pipe providing mutual support and interaction.

The braiding material can also act as a barrier to the resin prior to and during curing and so ensure that the adjacent braided bundles in the flexible pipe body structure are not bonded together as a result of the curing process, providing a much more flexible structure to the finished flexible pipe.

Figure 8:
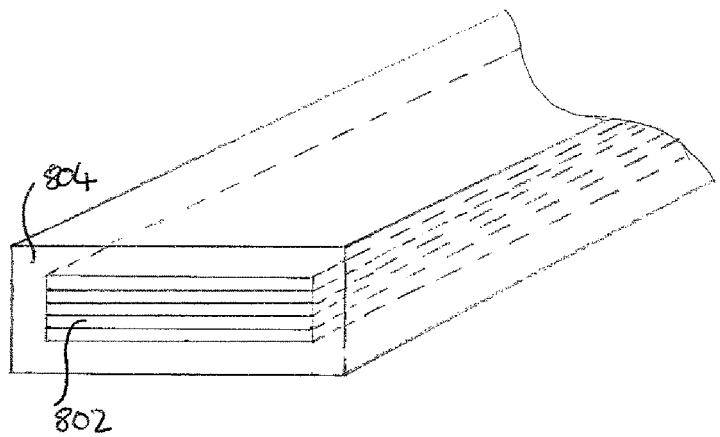
FIG. 8 illustrates a yet further braided bundle of the present invention.

FIG. 8 shows another alternative in which flat rectangular filaments are bundled together along their broader sides, and then a braiding element 804 applied to form a braided bundle.

With the above-described arrangement a pipe body produced by the method may have increased flexibility and strength and protection from damage compared to other known arrangements.

With the above-described arrangement, any bending strain on the filaments of composite forming the armour layer is minimised.

Such 'in-situ' curing of the composite of the armour layer enables an armour layer to be formed substantially or completely free of residual strain within the material, because the material is not significantly bent or reformed subsequent to curing. The bending radius and twist occurs when the material is in its pre-cured state (which does not affect the material) and no bending or torsional stress is applied to the material post-curing except those anticipated during service of the pipe. This gives a higher quality product compared to known armour layers, since the armour element contains more useable strength then known armour elements that contain some residual strain. The product is more efficient than known armour layers in terms of strength per amount of material, and thus a longer pipe for deeper application is possible.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing a flexible pipe body comprising:
   providing two or more composite filaments as a filament bundle, each composite filament comprising a length of composite matrix material in pre-preg form and reinforcing fibres;
   applying a braid element around the filament bundle as a braided bundle;
   providing a further filament bundle;
   applying a braid element around the further filament bundle as a further braided bundle; helically wrapping the braided bundle and further braided bundle around a flexible pipe body layer to form a layer, wherein the or each braided bundle is pre-formed to a helix by guides, wherein the or each pre-formed braided bundle retains its pre-formed helix prior to curing of the bundle matrix as a result of comprising stiffening elements;
   and then curing the composite filaments.

2. A method as claimed in claim 1 further comprising applying a lubricant or uncured resin to the filament bundle prior to applying the braid element.

3. A method as claimed in claim 1 further comprising applying a composite matrix material between the two or more composite filaments.

4. A method as claimed in claim 1 wherein the two or more composite filaments comprise a unidirectional composite fibre.

5. A flexible pipe body for transporting fluids from a sub-sea location, comprising:
   an inner layer; and
   an armour layer provided over the inner layer, wherein said armour layer is obtainable by:
      providing two or more composite filaments as a filament bundle, each composite filament comprising a length of composite matrix material in pre-preg form and reinforcing fibres;
      applying a braid element around the filament bundle as a braided bundle;
      providing a further filament bundle;
      applying a braid element around the further filament bundle as a further braided bundle
      helically wrapping the braided bundle and further braided bundle around the inner layer to form a layer as the armour layer, wherein the or each braided bundle is pre-formed to a helix by guides, wherein the or each pre-formed braided bundle retains its pre-formed helix prior to curing of the bundle matrix as a result of comprising stiffening elements;
      and then curing the one or more composite filament.

6. A flexible pipe body as claimed in claim 5 wherein the two or more composite filaments comprises a unidirectional composite fibre.

7. A flexible pipe body as claimed in claim 5 wherein the two or more composite filaments comprise a thermosetting or thermoplastic material.

8. A flexible pipe body as claimed in claim 5 wherein the reinforcing fibres are glass fibres, carbon fibres, a polypropylene, a polyethylene, a polyester, a polyamide, a fluoropolymer, a PVDF, a polymer tape, polymer fibres, a reinforced polymer tape, a fibre yarn, thermoplastic material, thermoset material, glass fibre composite tape, aramid fibre yarn, metallic wires, tapes or fibres with thermoplastic encapsulation, tapes or fibres with partial thermoset matrix impregnation, or a combination thereof.

9. A flexible pipe body as claimed in claim 5 wherein the braid element comprises a polymer tape, polymer fibres, glass fibres, carbon fibres, a polypropylene, a polyethylene, a polyester, a polyamide, a fluoropolymer, a PVDF, a reinforced polymer tape, a fibre yarn, thermoplastic material, thermoset material, glass fibre composite tape, aramid fibre yarn, metal wires, tapes or fibres with thermoplastic encapsulation, tapes or fibres with partial thermoset matrix impregnation, any of the above fibres or tapes combined with or coated with PTFE, or a combination thereof.

10. A flexible pipe body as claimed in claim 5 wherein said at least one composite filament comprises one of: a substantially rectangular cross-section; a substantially circular cross-section, a substantially Z shaped cross section, a substantially T shaped cross section, a substantially C shaped cross section, or an X cross section.

11. A flexible pipe body as claimed in claim 5 wherein a combination of shapes are used in the same layer of pipe body.

12. A flexible pipe body as claimed in claim 5 wherein bonding between the braided bundle and the further braided bundle during the curing process for the composite filaments is prevented by the braid elements of the braided bundle and the further braided bundle.

13. A flexible pipe body as claimed in claim 5 wherein the curing process for the composite filaments is achieved or assisted by the direct heating of elements within the filament bundle by induction.

14. A flexible pipe body as claimed in claim 5 wherein the curing process for the composite filaments is achieved or assisted by the use of infra-red or microwave or direct radiant, conducted or convected heating.

15. A flexible pipe body as claimed in claim 5 wherein the one or more composite filaments comprises a lubricant of oil, wax, or uncured resin.

16. A flexible pipe body as claimed in claim 5 wherein the armour layer is obtainable by the process of providing a further filament bundle, applying a braid element around the filament bundle as a further braided bundle, prior to the steps of helically wrapping the braided bundle and further braided bundle and curing the composite filaments.

17. A flexible pipe comprising a flexible pipe body as claimed in claim 5 and one or more end fittings connected thereto.

* * * * *